(12) United States Patent
Babcock et al.

(10) Patent No.: US 10,917,579 B2
(45) Date of Patent: Feb. 9, 2021

(54) METHODS AND SYSTEMS FOR DATA COLLECTION BY DRONE AIRCRAFT

(71) Applicant: American Robotics, Inc., Marlborough, MA (US)

(72) Inventors: Eitan Babcock, Medford, MA (US); Reese A. Mozer, Medford, MA (US); Vijay Somandepalli, Waltham, MA (US)

(73) Assignee: American Robotics, Inc., Marlborough, MA (US)

( * ) Notice: Subject to any disclaimer, the term of this patent is extended or adjusted under 35 U.S.C. 154(b) by 0 days.

(21) Appl. No.: 16/427,562

(22) Filed: May 31, 2019

(65) Prior Publication Data

US 2019/0373179 A1    Dec. 5, 2019

Related U.S. Application Data

(60) Provisional application No. 62/678,697, filed on May 31, 2018.

(51) Int. Cl.
*H04N 7/18*     (2006.01)
*H04N 5/232*    (2006.01)
(Continued)

(52) U.S. Cl.
CPC ....... *H04N 5/23299* (2018.08); *B64C 39/024* (2013.01); *B64D 47/08* (2013.01); *H04N 5/2253* (2013.01); *B64C 2201/127* (2013.01)

(58) Field of Classification Search
CPC ............. H04N 5/23299; H04N 5/2257; H04N 5/2253; B64C 39/024; B64C 2201/127; B64D 47/08
See application file for complete search history.

(56) References Cited

U.S. PATENT DOCUMENTS 6,237,241 B1 *  5/2001  Aaron .................. B25J 17/0266
                                                         33/613
2016/0119065 A1   4/2016  Tobias et al.
(Continued)

FOREIGN PATENT DOCUMENTS

JP    2017-085263 A    5/2017
KR    10-1758365 B1    7/2017

OTHER PUBLICATIONS

International Search Report and Written Opinion for International Application No. PCT/US2019/034808 dated Sep. 11, 2019.

*Primary Examiner* — Peet Dhillon
(74) *Attorney, Agent, or Firm* — Foley Hoag LLP; Rajesh Vallabh (57) ABSTRACT

A data collection method and system for a drone aircraft. The system includes a data collection device, an extension mechanism having one end connected to the drone aircraft and an opposite free end connected to the data collection device, and a control system for controlling operation of the extension mechanism. The extension mechanism is extendable from a retracted position in which the data collection device is stowed in or maintained proximate to the drone aircraft to one or more extended positions in which the data collection device is extended away from the drone aircraft, and is also retractable to bring the data collection device back to the retracted position. The control system controls operation of the extension mechanism to position the data collection device to a desired position beyond a given obstacle to enable the data collection device to capture data relating to an object or region of interest.

16 Claims, 5 Drawing Sheets

(51) Int. Cl.
  *H04N 5/225*  (2006.01)
  *B64C 39/02*  (2006.01)
  *B64D 47/08*  (2006.01)

(56) References Cited

U.S. PATENT DOCUMENTS

| | | |
|---|---|---|
| 2016/0169772 A1 | 6/2016 | Olmedo et al. |
| 2017/0024854 A1 | 1/2017 | Humfeld |
| 2017/0197718 A1* | 7/2017 | Buchmueller ............ B64D 1/12 |
| 2017/0328814 A1 | 11/2017 | Castendyk et al. |
| 2018/0035606 A1* | 2/2018 | Burdoucci ............ A01D 34/008 |
| 2018/0284575 A1* | 10/2018 | Sugaki ................. G03B 17/561 |
| 2019/0116719 A1* | 4/2019 | Fletcher ................ A01B 79/005 |

* cited by examiner

METHODS AND SYSTEMS FOR DATA COLLECTION BY DRONE AIRCRAFT

CROSS REFERENCE TO RELATED APPLICATION

This application claims priority from U.S. Provisional Patent Application No. 62/678,697 filed on May 31, 2018 entitled METHODS AND APPARATUS FOR DATA COLLECTION BY DRONE AIRCRAFT, which is hereby incorporated by reference.

BACKGROUND

The present application relates generally to remotely piloted or autonomous aerial vehicles or drones and, more particularly, to methods and systems for collecting data using such vehicles.

BRIEF SUMMARY OF THE DISCLOSURE

A data collection system for a drone aircraft in accordance with one or more embodiments includes a data collection device, an extension mechanism having one end connected to the drone aircraft and an opposite free end connected to the data collection device, and a control system operably coupled to the extension mechanism and the data collection device for controlling operation of the extension mechanism. The extension mechanism is extendable during operation of the drone aircraft from a retracted position in which the data collection device is stowed in or maintained proximate to the drone aircraft to one or more extended positions in which the data collection device is extended away from the drone aircraft. The extension mechanism is also retractable to bring the data collection device back to the retracted position. The control system controls operation of the extension mechanism to position the data collection device during operation of the drone aircraft in a desired position beyond a given obstacle to enable the data collection device to capture data relating to an object or region of interest.

A method of collecting data using a drone aircraft in accordance with one or more embodiments comprises: (a) flying the drone aircraft to a given aerial position, (b) extending a data collection device from the drone aircraft from a retracted position proximate to the drone aircraft to a desired position away from the drone aircraft beyond a given obstacle such that the data collection device is proximate to an object or region of interest, (c) capturing data relating to the object or region of interest using the data collection device, and (d) retracting the data collection device from the desired position back to the retracted position.

BRIEF DESCRIPTION OF THE DRAWINGS

Like or identical reference numbers are used to identify common or similar elements.

DETAILED DESCRIPTION

One of the common uses for remotely piloted or autonomous aerial vehicles or drones is to collect aerial data including imagery. This is typically done by using cameras or image sensors that are looking downwards towards the ground where the objects or areas of interest are located. These cameras or sensors can be mounted or suspended from the aerial vehicle by means of direct incorporation into the drone body, rigid suspension from the drone body, rigid but movable suspensions (e.g., gimbals), or suspended by flexible means (e.g., hung from springs or similar flexible materials) from the drone body. The cameras and sensors may be oriented such that they are looking directly downward (nadir-facing) or tilted such that they are collecting data from an angled perspective.

However, certain data cannot be gathered from a purely nadir or tilted perspective, and such data can only be gathered from vantage points or perspectives such as the side, underneath an overhanging protrusion, or in between nearby obscuring objects. Flying the aerial vehicle to one side and tilting a camera or sensor with a gimbal is often not enough to collect data from these different perspectives, as the obstructions mentioned above require locating the camera or sensors in positions that are not accessible by current drone systems. Additionally, drones may not be able to fly close enough to the objects or regions of interest to generate image or sensor resolutions high enough for certain types of data collection for reasons such as safety of nearby living beings or safety of nearby structures or other aerial vehicles. The very operation of the drones may also disturb the area or object of interest due to operational causes such as noise, prop wash, or other forms of interference. This would corrupt or severely hinder the quality and usability of any collected data.

Figure 1:
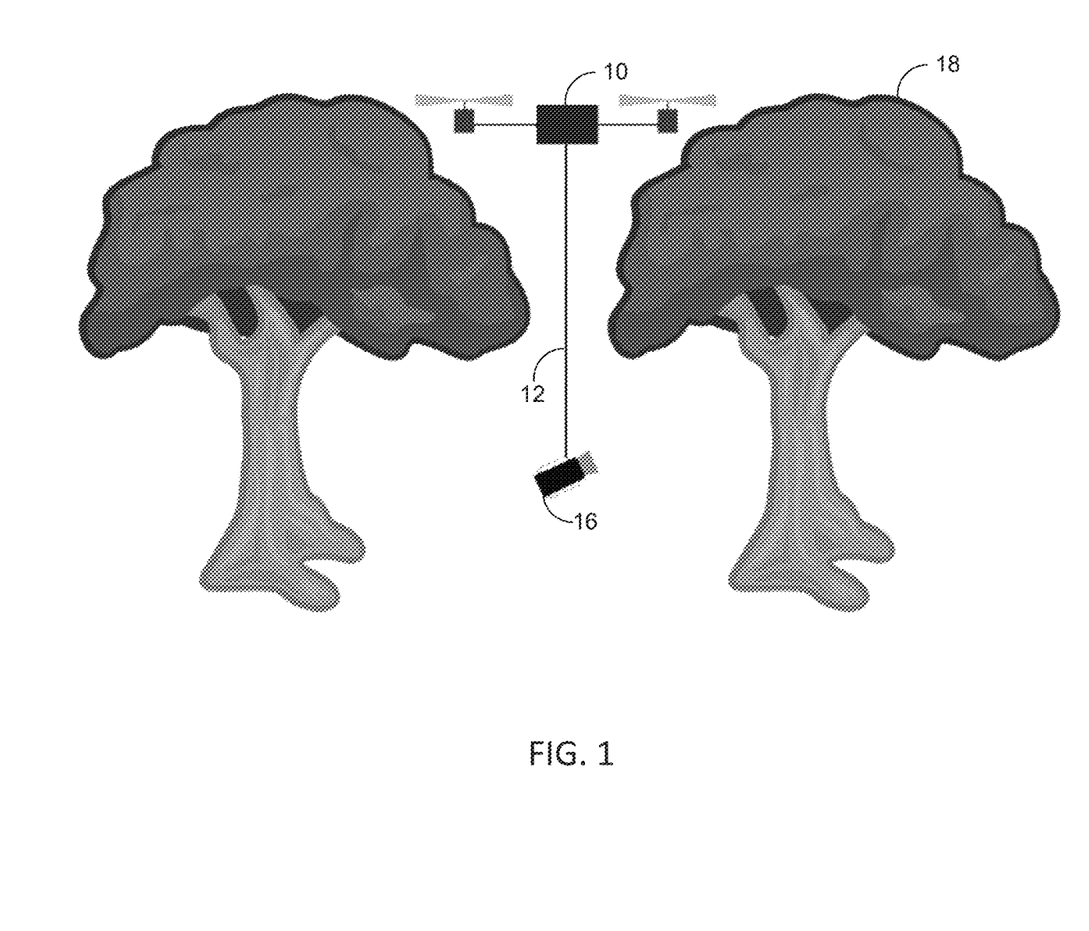
FIG. 1 is a simplified diagram illustrating operation of an exemplary data collection system for a drone aircraft in accordance with one or more embodiments.

One example of such data collection is in agriculture to photograph and image plants. In accordance with one or more embodiments, methods and apparatus are disclosed to enable gathering of data that otherwise might not be directly accessible to a data collection system that is operating above the plants and observing from a traditional nadir perspective. For example, in orchards with trees, using the methods and systems disclosed herein, data and imagery can be obtained from the underside of the tree canopies, and from areas that are obscured by the tops of the tree canopies. Such systems can also be used to obtain very high resolution data and imagery of plant and tree surfaces such as stems, fruits, barks, roots, which can be used to detect and identify problems with high specificity. FIG. 1 is a simplified diagram illustrating an example of this mode of operation and data collection. The figure shows a drone aircraft 10 having an extension mechanism 12 used to position a camera, sensor, or other data collection device 16 at a desired position beyond a tree 18 or other obstacle to capture data relating to an object or region of interest.

The extension system 12 is configured to extend the intended imaging or data capture device 16 beyond the confines and reach of a normal flying robot or drone 10. By incorporating such an extension, the drone 10 can get closer to the regions, areas, or objects of interest that the drone 10 alone may not be able to reach or access to collect imagery or other forms of data at very high resolutions. Such an extension system 12 could also permit the viewing or observation of features and objects from an angle that otherwise would not be visible from a traditional nadir view point. These viewing angles may become necessary because of obscuration of the objects of interest by foliage, canopies, or neighboring plants and trees, in the case of an agricultural application. The object or view of interest may also be located between objects that are obscured from direct view of the drone or aerial robot. Such a system is also expected to be able to collect data and imagery from the lateral and undersides of the objects being interrogated. The extension system 12 and data capture device 16 enable the carrier drone aircraft 10 to be able to perform these functions without become hazardous or colliding with nearby objects or people, and without disturbing the objects of interest from operationally induced disturbances such as displacements due to rotor downwash, engine noise from the drone or robot, etc.

The extension mechanism 12 as controlled by a control system 30 is capable of positioning the collection device 16 various distances away from the drone aircraft 10. In one or more exemplary embodiments, the extension mechanism 12 is capable of positioning the collection device 16 at least 5 feet away from the drone aircraft 10. In one or more exemplary embodiments, the extension mechanism 12 is capable of positioning the collection device 16 at least 10 feet away from the drone aircraft 10.

The extension system 12 enables the data collection device 16 to be extended from the drone or robot 10 by a variety of mechanisms. In one or more embodiments, the mechanism comprises a rope-like extension/retraction system that may facilitate such extension by coiling and uncoiling a cord carrying the data collection device 16. In one or more embodiments, the mechanism comprises a system of independently articulated arms. In one or more embodiments, the mechanism comprises a rigid telescoping extension system. A rigid telescoping extension system may be configured and mounted in such a way that the extension is directly downwards from the vehicle carrying the extension, or at an angle other than vertical from the body of the vehicle carrying the mechanism, or such that the data collection device or imager may be extended at a combination of angles and directions through a system of joints, motors, and/or other suitable actuators that may be installed on the extension mechanism itself. The extension system 12 itself may also serve as a conduit between the drone and the data capturing device (camera or other sensors) for other features such as power, data connections, stabilization mechanisms, etc.

The data collection device 16 can be a variety of data capture devices such as cameras or sensors such as multispectral sensors (e.g., MicaSense, Sentera, or similar sensors), RGB sensors (e.g., Sony, ON Semiconductor, or similar sensors), or thermal sensors (e.g., FLIR or similar sensors). The data collection device 16 is preferably located at the free end of the extension system 12 to maximize its reach away from the body of the drone aircraft 10. In accordance with one or more embodiments, the data collection device 16 can be articulated by means of wheels, joints, or other means of locomotion such that it may be able to travel and position itself at any location between the drone and the end of the extension mechanism 12. For a data collection device 16 such as a camera, the viewing angle (or data collection angle) can be dictated by multiple fixed or movable means. A camera mounted at a fixed angle relative to the drone aircraft could remain fixed at that angle as it travels along and to the end of the extension system such that the relative angle between the camera and the drone is maintained when the camera has reached its desired imaging location (e.g., under the canopy of a tree with the drone located and holding position above the tree). The camera or data collection device may also be mounted on a mechanical or motorized stabilization mechanism such as a gimbal or optical mount such that it maintains its set viewing angle even when the drone and the extension mechanism may not be stable because of effects such as wind or vehicle dynamics. Cameras may also include fish-eye or wide angle lenses such that the regions of interest are always in view of the imaging sensor on the camera even if there are small displacements in the position and orientation of the camera when it is positioned on the extension system 12. In one or more embodiments, the extension system 12 can handle multiple data collection devices 16 attached thereto. Depending upon the mode of operation, and the conditions of the site where the data is being collected, the position and orientation of the sensor along or on the extension system may be dictated by the location of the extension system itself, in air near the drone aircraft, or by contact with a secondary solid surface such as the ground or plant/tree surface such as bark or trunk.

Figure 2:
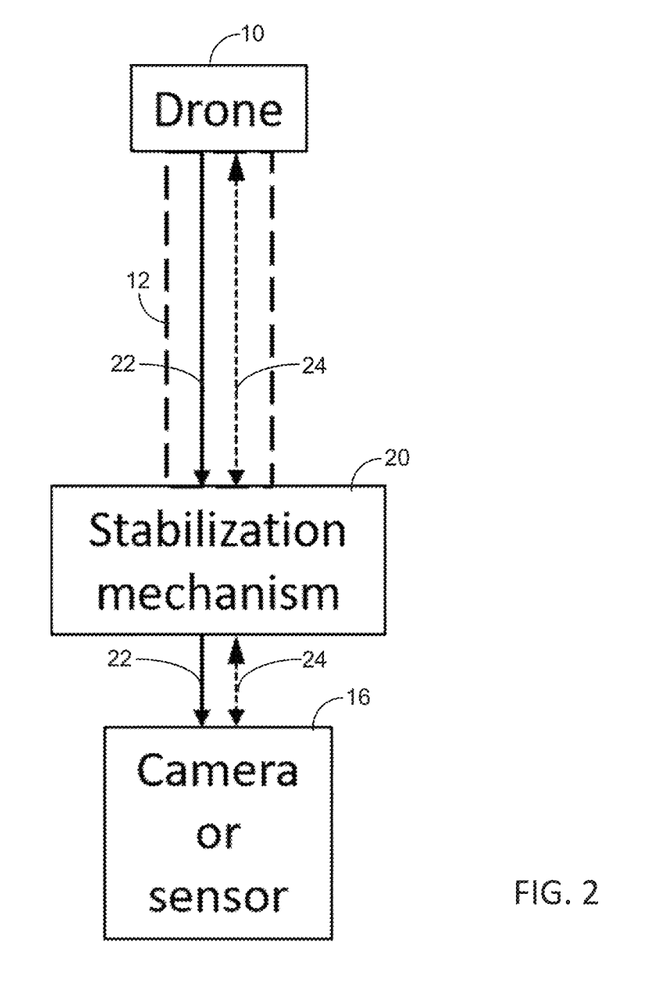
FIG. 2 is a simplified block diagram illustrating an exemplary extension mechanism of a data collection system in accordance with one or more embodiments.

FIG. 2 shows a simplified block diagram showing an extension system 12 connected at one end to the drone 10 and at an opposite end to a stabilization mechanism 20, which holds the data collection device 16. Power lines 20 to provide power to the stabilization mechanism 20 and the data collection device 16 from the drone 10. Data lines 24 are used for transferring data between the drone 10 and the data collection device 16.

Figure 3:
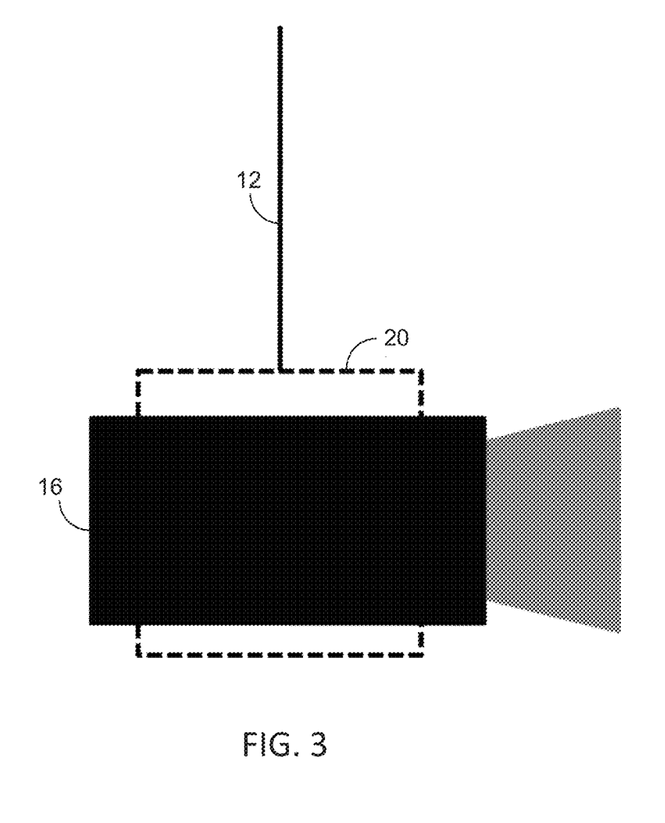
FIG. 3 is a simplified diagram illustrating an exemplary stabilization system for data collection system in accordance with one or more embodiments.

The extension mechanism 12 may be rigid in some embodiments and flexible in other embodiments. If the extension mechanism 12 is flexible, the system can be steadied when suspended in the air by a multitude of methods. Such methods for steadying include, e.g., a coil that only bends or coils in one direction or orientation, a stowable and telescoping flexible assembly, a tensioning device that creates rigidity of the extension system after the extension mechanism has been deployed or extended, small or micro air thrusters, secondary propellers or other thrust producing mechanisms that are attached to and part of the extension system being disclosed here. Data collection from the data collection device 16 on the extension system can also further be improved by the use of additional stabilization and improvement mechanisms such mechanical or motorized gimbals. Using high rate date acquisition techniques such as high-speed shutters in conjunction with the extension system is also disclosed as part of these embodiments. FIG. 3 is a simplified block diagram illustrating construction of a system including a passive or active stabilization mechanism 20 coupled to a data collection device 16. The stabilization mechanism 20 is suspended in the air by the extension mechanism 12, which can be flexible or rigid.

If the extension system 12 is extended such that the data collection device 16 is made to contact a secondary solid surface such as the ground, bark of a tree or another surface of the object being surveilled, the performance of the data collection from the sensor device 16 can be improved by additional techniques in accordance with one or more embodiments. Such techniques include the use of the weight and friction of the sensor device 16 against the secondary surface to stabilize the sensor device 16 as it collects data (as depicted in FIG. 4), and means that are built into the extension mechanism 12 to grip or grab the secondary surface such as grippers, spikes or other mechanical means.

In one or more embodiments, the camera or other sensor devices 16 may use a fixed zoom system, optical zooming and lensing, or digital zooming and amplification. Zooming in on or enhancing an area of interest could be used to obtain better fidelity of the data collection in those regions that are enabled by the embodiments disclosed herein.

Figure 4:
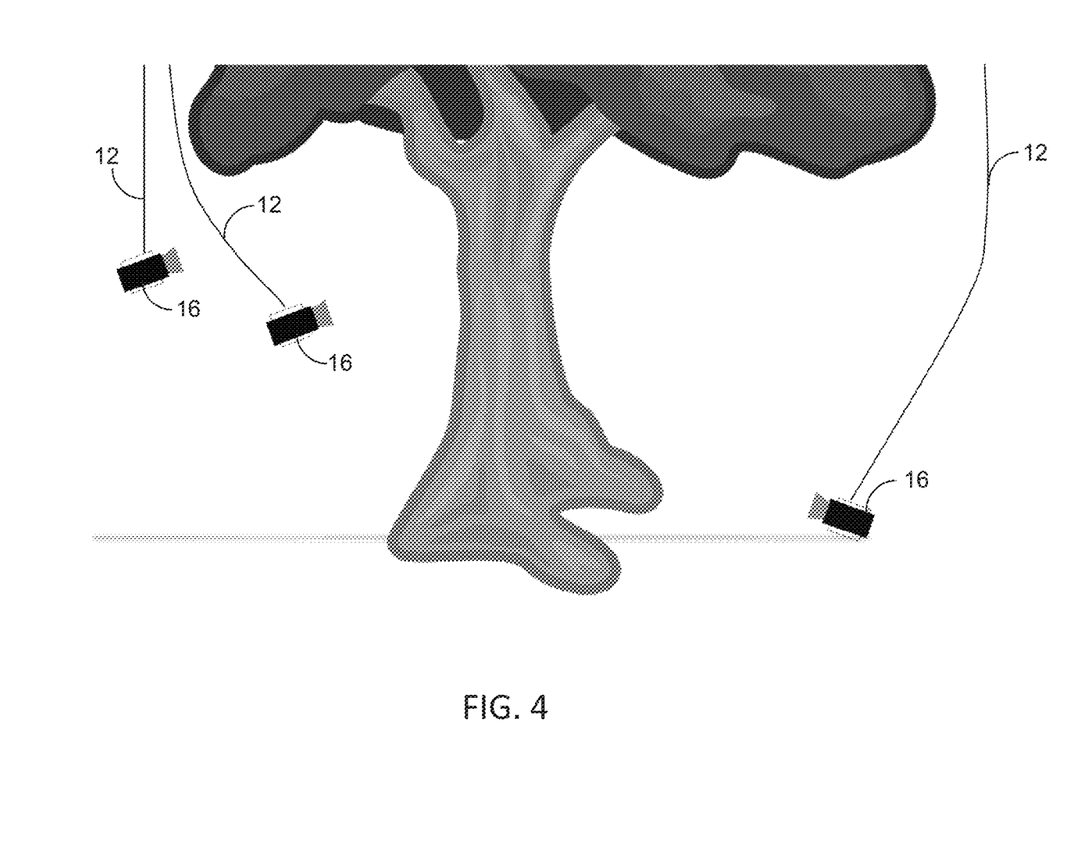
FIG. 4 illustrates operation of different types of data collection systems in accordance with one or more embodiments.

FIG. 4 shows different modes of employment of the system disclosed here around and under a tree. The data collection device 16 can be suspended straight down from the drone aircraft 10 by a rigid or flexible suspension mechanism 12, or suspended from a mechanism 12 that allows a bend toward the tree, or resting on the ground attached by a tether system 12 to the drone aircraft 10.

Figure 5:
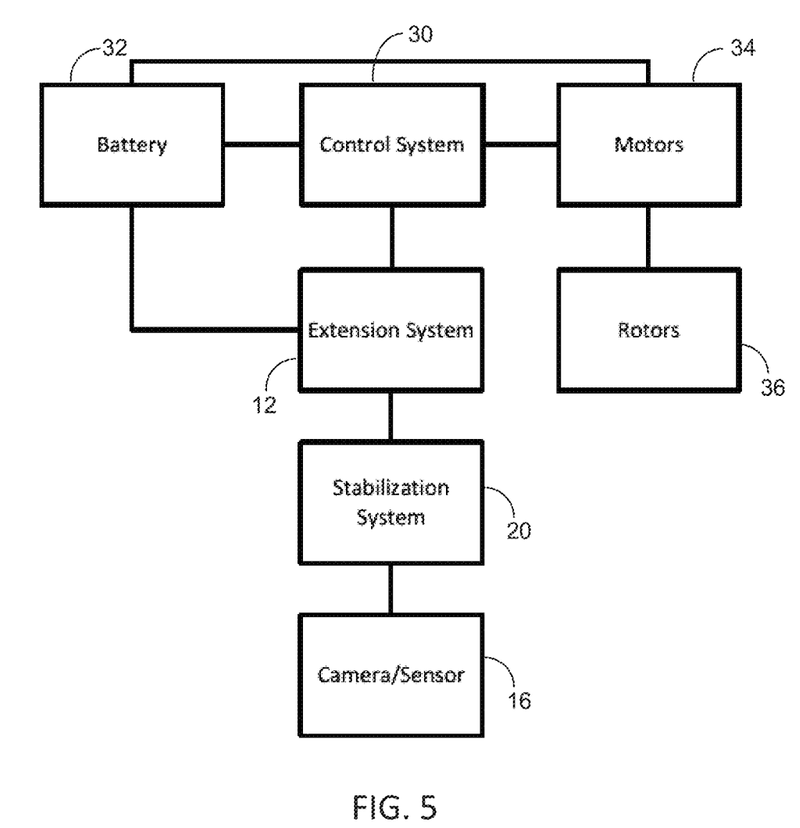
FIG. 5 is a simplified block diagram illustrating select components of an exemplary data collection system in accordance with one or more embodiments.

FIG. 5 is a simplified block diagram of select components of an exemplary data collection system for the drone aircraft 10 in accordance with one or more embodiments. The drone aircraft 10 includes a battery 32 for powering the aircraft, a set of rotors 36 driven by motors 34, and a control system 30 for operating various components of the drone aircraft 10. The control system 30 can also control operation of the data collector device 16 and the extension system 12 for positioning the data collector device 16 at a desired location away from the drone body. The control system 30 can comprise one or more microcontrollers, microprocessors, digital signal processors, application-specific integrated circuits (ASIC), field programmable gate arrays (FPGA), or any general-purpose or special-purpose circuitry that can be programmed or configured to perform the various data collection and other functions described herein.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A data collection system for a drone aircraft, comprising:
   a data collection device;
   an extension mechanism having one end connected to the drone aircraft and an opposite free end connected to the data collection device, wherein the extension mechanism is extendable during operation of the drone aircraft from a retracted position in which the data collection device is stowed in or maintained proximate to the drone aircraft to one or more extended positions in which the data collection device is extended away from the drone aircraft, and wherein the extension mechanism is retractable during operation of the drone aircraft from the one or more extended positions back to the retracted position, and wherein the extension mechanism comprises a cord connected to the data collection device; and
   a control system operably coupled to the extension mechanism and the data collection device, said control system configured to control operation of the extension mechanism to maneuver the data collection device during operation of the drone aircraft to the desired aerial position beyond a given obstacle such that the obstacle is between the data collection device and the drone aircraft to enable the data collection device to capture data relating to an object or region of interest underneath the given obstacle,
   wherein extending the data collection device comprises uncoiling the cord connected to the data collection device and controllably bending the cord to position the data collection device at the desired position.

2. The system of claim 1, wherein the data collection device comprises a camera.

3. The system of claim 1, wherein the data collection device comprises a multispectral sensor, an RGB sensor, or a thermal sensor.

4. The system of claim 1, wherein the obstacle is a tree, and the desired position of the data collection device is a position under a canopy of the tree, while the drone aircraft is above the tree.

5. The system of claim 1, wherein the obstacle is an overhanging protrusion, and the desired position of the data collection device enables the data collection device to capture an image underneath the overhanging protrusion, while the drone aircraft is above the overhanging protrusion.

6. The system of claim 1, wherein the extension mechanism includes cables for providing a power and data connection between the drone aircraft and the data collection device.

7. The system of claim 1, further comprising a stabilization mechanism connected to the data collection device to maintain a given viewing angle of the data collection device when the data collection device is in the desired position.

8. The system of claim 7, wherein the stabilization mechanism comprises a motorized or non-motorized gimbal or optical mount.

9. A method of collecting data using a drone aircraft, comprising:
   (a) flying the drone aircraft to a given aerial position;
   (b) while the drone aircraft is in the given aerial position, extending a data collection device from the drone aircraft from a retracted position wherein the data collection device is stowed in the drone aircraft or otherwise proximate to the drone aircraft to a desired position away from the drone aircraft beyond a given obstacle such that the obstacle is between the data collection device and the drone aircraft and the data collection device is proximate to an object or region of interest wherein extending the data collection device comprises uncoiling a cord connected to the data collection device and controllably bending the cord to position the data collection device at the desired position;
   (c) capturing data relating to the object or region of interest using the data collection device;
   (d) retracting the data collection device from the desired position to the retracted position; and
   (e) flying the drone aircraft away from the given aerial position.

10. The method of claim 9, wherein the data collection device comprises a camera and wherein capturing data comprises capturing image data.

11. The method of claim 9, wherein the data collection device comprises a multispectral sensor, and wherein capturing data comprises capturing multispectral image data.

12. The method of claim 9, wherein the data collection device comprises a thermal sensor, and wherein capturing data comprises capturing thermal infrared data.

13. The method of claim 9, wherein the obstacle is a tree, and the desired position of the data collection device is a position under a canopy of the tree, while the drone aircraft is above the tree.

14. The method of claim 9, wherein the obstacle is an overhanging protrusion, and the desired position of the data collection device enables the data collection device to capture an image underneath the overhanging protrusion, while the drone aircraft is above the overhanging protrusion.

15. The method of claim 9, further comprising stabilizing the data collection device to maintain a given viewing angle of the data collection device when the data collection device is in the desired position.

16. The system of claim 1, wherein the extension mechanism includes a cord system having a coiling/uncoiling mechanism for extending or retracting the cord.

* * * * *